FREQUENCY MODULATED MULTIPLEX SYSTEMS

Filed Jan. 24, 1950 3 Sheets-Sheet 1

INVENTOR
RAYMOND M. WILMOTTE
BY Hyman Hurwitz
his ATTORNEY

INVENTOR
RAYMOND M. WILMOTTE

BY Hyman Hurwitz his ATTORNEY

INVENTOR
RAYMOND M. WILMOTTE

BY Hyman Hurwitz
his ATTORNEY

United States Patent Office 2,779,020 Patented Jan. 22, 1957

2,779,020

FREQUENCY MODULATED MULTIPLEX SYSTEMS

Raymond M. Wilmotte, Washington, D. C., assignor to Padevco, Inc., Washington, D. C., a corporation of Delaware Application January 24, 1950, Serial No. 140,244

21 Claims. (Cl. 343—200)

The present invention relates generally to systems for the transmission of intelligence by modulation of radio frequency carriers, and more particularly to systems for the simultaneous transmission of two co-channel or hetero-channel frequency modulated signals, and for the separate reception of these signals at a remote location, without mutual interference therebetween.

It is a broad object of the present invention to provide a novel communication system.

It is a further broad object of the invention to provide a system for more efficiently utilizing radio frequency channels.

It is another object of the invention to provide a system for transmitting two frequency modulated signals in overlapping relation, and for separately demodulating the signals at a remote location, without mutual interference therebetween.

It is a further object of the invention to provide a novel system for the transmission of two modulation signals, wherein one or both of the signals is utilized to modulate a first carrier in frequency, and wherein a further co-channel or separate channel carrier is modulated in frequency simultaneously in response to both modulation signals.

It is still a further object of the present invention to provide a novel system of secrecy communication.

It is another object of the invention to provide a novel system of secrecy communication by frequency modulation of carriers.

It is still another object of the invention to provide a system of secrecy communication, wherein a first carrier is modulated in frequency in response to intelligence, and also in response to random signals, and wherein a co-channel carrier is transmitted, which has greater amplitude than the first carrier, and which is modulated in frequency only with the random signals, and wherein at a remote location the intelligence bearing signals may be derived without interference from the random signals.

It is a further object of the invention to provide a system for transmitting two separate modulations, both as frequency modulations of two separate carriers, which may be identical in frequency when unmodulated, or which may be separated in frequency, and for separately detecting the two separate modulations.

The above and still further objects, features and advantages of the present invention will become apparent upon consideration of a specific embodiment thereof, especially when taken in conjunction with the accompanying drawings wherein.

Figure 1:
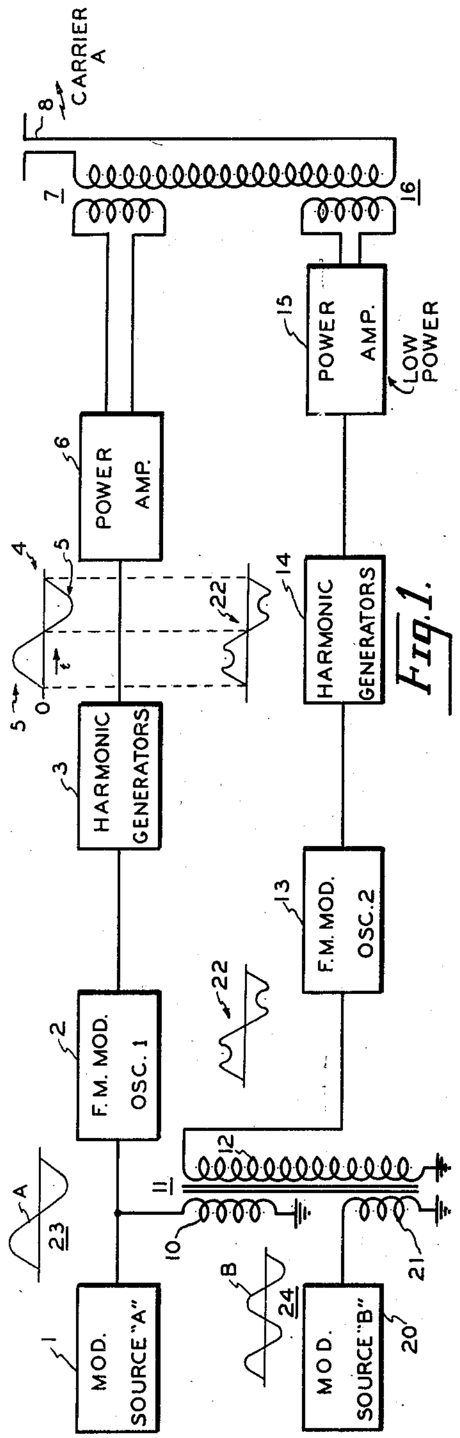
Figure 1 is a block diagram of a transmitting system arranged in accordance with one embodiment of the invention.

Briefly described, in accordance with the present invention as illustrated in Figure 1, a first source of intelligence (or of random signals), is utilized to modulate the frequency of a carrier "A" which is radiated at relatively high power. This same source of modulation is likewise utilized to modulate the frequency of a second carrier "$A+B$," which is further modulated in frequency in response to a second source of intelligence. Modulation in response to the first mentioned source of intelligence is accomplished in such manner that both carriers, in the absence of the second source of intelligence, provide, at all times, identical frequency swings as nearly as the state of the art will permit. The second source of intelligence accordingly introduces into the frequency modulations of the second carrier "$A+B$" a factor representative of the second intelligence, superposed on a factor representative of the first intelligence. The second carrier "$A+B$" is radiated at relatively low power. Accordingly, a conventional receiver, upon receiving the carriers "A" and "$A+B$" provided by the first and second oscillators, will detect the modulations on the first carrier "A," without undue interference from the second, unless the latter is of very appreciable amplitude in comparison with the amplitude of the first carrier. However, a conventional receiver will be unable to detect the second modulation, for one reason because it is transmitted as modulation of a weak FM carrier which is in the presence of a stronger FM carrier, and, for a second reason, because the modulation of the weak carrier, considered per se, does not represent the second modulating signal.

Accordingly, if the first modulating signal represents completely random or unintelligible modulations, no intelligence will be derivable from both signals in a conventional frequency modulation receiver. If, on the other hand, the first modulation represents intelligence, this intelligence may be derived by means of a conventional frequency modulation receiver, but the second modulating signal will be unavailable.

Figure 2:
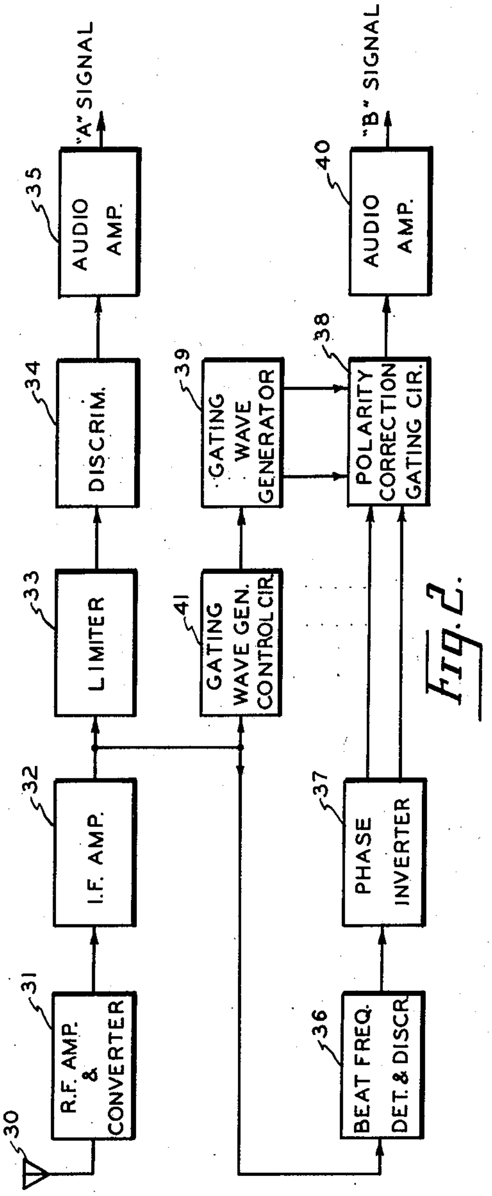
Figure 2 is a schematic circuit diagram of a receiver, arranged in accordance with the invention, for receiving transmissions from the transmitting system of Figure 1.

In accordance with the present invention, a novel receiving system is provided, illustrated in Figure 2, which is capable of deriving both the first and second modulations, each without interference from the other. If the first modulation represents a random signal, or a signal conveying no intelligence, but one which is designed to mask the presence of the second signal, it is, nevertheless, possible by means of my novel receiving system to demodulate the second signal without interference from the first.

It is well known that receiving systems in general introduce distortion in the process of demodulating signals. It may accordingly be expected that the receiving system illustrated in Figure 2 of the accompanying drawings will introduce distortion in the process of demodulating the two separate signals received thereby. Such distortion may be reduced by the process of introducing at the transmitter of the system a predistortion signal generated by demodulating at the transmitter the transmitted signals, by means of a receiver of the character of that illustrated in Figure 2 of the accompanying drawings, the predistortion introduced at the transmitter being in inverse phase to that which may be expected to be introduced at the receiver of the system. The transmitter illustrated in Figure 3 of the accompanying drawings accordingly represents a transmission system corresponding with that of Figure 1 of the accompanying drawings except that in Figure 3 predistortion is introduced, while in Figure 1 no such predistortion is utilized.

Figure 4:
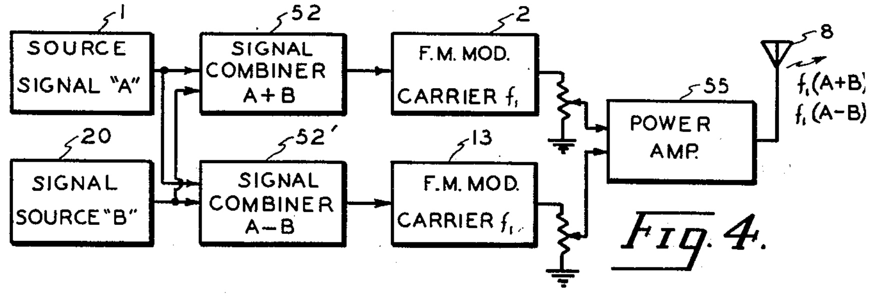
Figure 4 is a block diagram of a modification of the system of Figure 1 wherein two co-channel carriers are each differently modulated by two distinct modulating signals.
Figure 5:
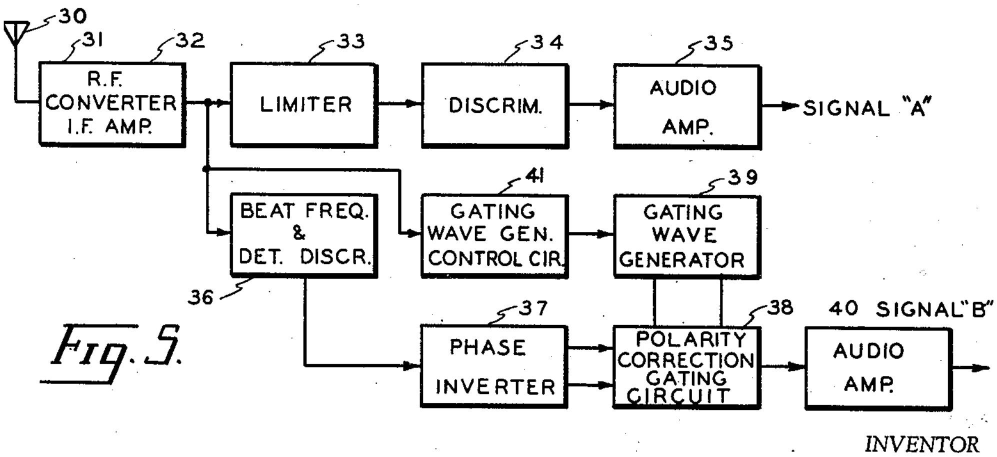
Figure 5 is a block diagram of a receiver which is capable of detection of the distinct modulating signals transmitted by the system of Figure 4.

In the systems of Figures 4 and 5 a modification of the system of Figure 1 is introduced in that each of the separate carriers is modulated by two modulation signals, one of the carriers in response to the sum of the modulation signals and the other in response to the difference of the modulation signals, the carriers being of the same amplitude, in contra-distinction to the system of Figure 1.

Figure 5 represents a receiving system for receiving signals from the transmitter illustrated in Figure 4, and for separately detecting the two modulating signals. If the modulating signals are represented as signals A and B, and it be assumed that one of the two carriers transmits signal $A+B$, while the other transmits $A-B$, a conventional frequency modulation receiver will detect the modulation A to the exclusion of B, since the signal B on both carriers is in opposite phase at all times, and accordingly is cancelled out of the resultant demodulated signal in the conventional receiver. On the other hand, if the beat frequency between the two carriers is measured, it will represent solely the frequency deviations produced by modulating signal B, since the beat frequency signal is the difference between the instantaneous frequencies of the two carriers, so that the deviations of the carriers due to the modulating signal A is cancelled out, while the deviations due to the modulating signal B are reinforced in the beat. Arrangements are provided in the receiving system of Figure 5 for detecting the beat signal and thereby for abstracting from the two carriers the modulation signal B.

Figures 6, 7, 8, 9:
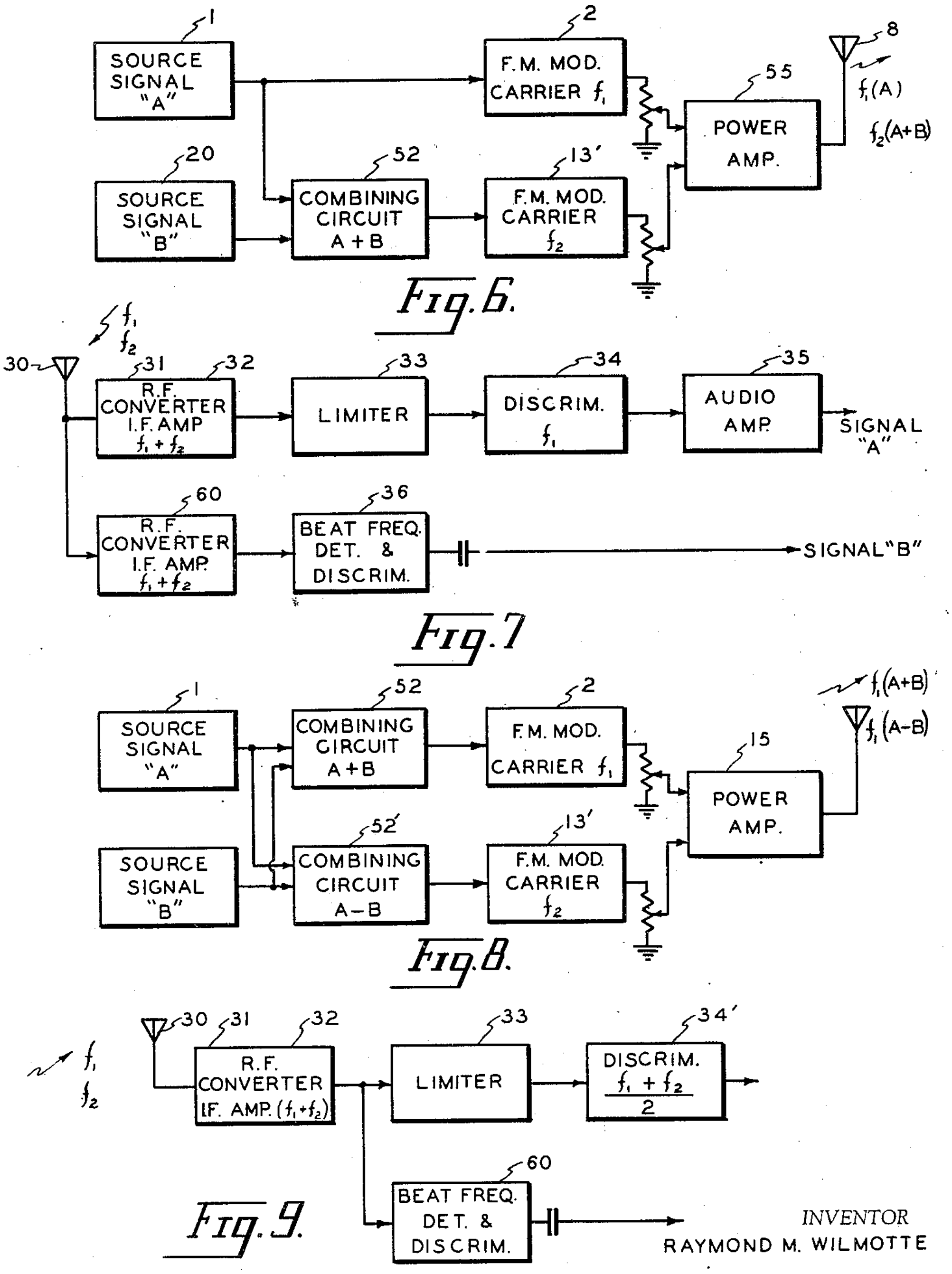
Figure 6 is a block diagram of a modification of the system of Figure 1 wherein is utilized two carriers of different frequencies which are in separate channels, or sufficiently separated so that the transmitted frequency modulated signals never overlap in frequency.
Figure 7 is a block diagram of a receiving system for separately detecting modulation signals transmitted by the transmitting system of Figure 6.
Figure 8 is a block diagram of a modification of the system of Figure 4, wherein each carrier is simultaneously modulated by two distinct modulating signals.
Figure 9 is a block diagram of a receiving system for separately detecting the modulating signals transmitted by the system of Figure 8.

Figures 6 and 7 illustrate still a further modification of the present system, corresponding generally with the system of Figures 1 and 2, but differing from the latter in that two distinct carriers are employed, which may be non-co-channel, and which, in any event, are so spaced that no overlapping of carrier signals occurs during modulation of the carriers. Transmissions from a system of this character may be received in an extremely simple receiver. The modulation inherent on the stronger of the two carriers, which may be assumed to be a single modulating signal A, may be detected by means of a conventional frequency modulation receiver. The weaker of the two carriers, which may be assumed to be modulated by the sum of two modulation signals, A and B, may be detected by a beat frequency detector and discriminator. Simplification is introduced into the receiving system of Figure 7, as compared with the receiving system of Figure 2, because the polarity of the beat signal is always correct in the system of Figure 7, by reason of the separation of the two carriers which are utilized, whereas in the system of Figure 2 the polarity of the beat signal after it has been detected is not necessarily correct, but correction must be accomplished continuously. Since relatively complex circuits are required to accomplish the polarity correction, the system of Figure 7 represents a very considerable simplification of the system of Figure 2. It should be noted, nevertheless, that the system of Figure 7 requires inherently a wider frequency spectrum for transmission of information than does the system of Figure 2, other things being equal.

The system of Figures 8 and 9 represents a modification of the system of Figures 6 and 7, in accordance with the principles utilized in the system of Figures 4 and 5. Briefly described, in the system of Figure 8, which represents the transmitter portion of a complete communication system, two modulation signals A and B are transmitted on two separate non-overlapping carriers of equal amplitude, one of the carriers transmitting the sum of the modulations while the other transmits the difference. As has been explained hereinbefore in connection with the system of Figures 4 and 5, a conventional frequency modulation receiver will then receive the modulation signal A, modulation B cancelling in the receiver, provided that the discriminator of the receiver is tuned to the mean of the two carriers when they are unmodulated. On the other hand, the signal B may be detected by means of a beat frequency detector and discriminator, without any necessity for resulting to polarity correction of the detected signal.

Referring now more specifically to the drawings, the reference numeral 1 identifies a source of modulation, which may be denominated intelligence "A." The modulation signal provided by modulation source 1 may be applied to a frequency modulation system 2 of conventional character, which may comprise, for example, an oscillator associated with a reactance tube for varying the frequency of the oscillator. The output of the frequency modulation system 2 may be multiplied in frequency in suitable harmonic generators 3, if desired, this multiplication accomplishing simultaneous increases in carrier frequency and in deviations of frequency of the system. The output of the harmonic generators 3 accordingly has a mean carrier frequency, represented as the zero base line of the plot 4, and which is subject to deviations 5, positively and negatively with respect to the mean value. The output of the harmonic generators 3 may be applied to a power amplifier 6 for amplification therein to relatively high power, and the output of the power amplifier 6 may be coupled via a coupling transformer 7 to a radiating antenna 8. The radiated carrier is carrier "A."

The output of the modulation source 1 is further applied to the primary winding 10 of a transformer 11, the secondary winding 12 of which is connected to a frequency modulated oscillator 13, so that the latter, which has a mean output frequency precisely equal to that of the system 2, will be deviated, in response to signal provided by modulation source 1, in the same sense and to the same extent as is the system 2, in response to signal provided by modulation source 1. The output of frequency modulated oscillator 13 is applied to harmonic generators 14, which are similar with harmonic generators 3, and the output of harmonic generators 14 is applied to a power amplifier 15 which is similar to power amplifier 6, but which provides materially less power than the latter. The output of the power amplifier 15 is coupled via a transformer 16 to the antenna 8.

Accordingly in response only to signals provided by modulation source 1, i. e., in response to intelligence "A," the outputs of power amplifiers 6 and 15 are similar at all times in respect to frequency, although they are of substantially different amplitudes.

A second modulation source 20 is provided, which carries intelligence which may be denominated intelligence "B." The output of modulation source 20 is coupled via a primary winding 21 to the secondary winding 12 of the transformer 11, and accordingly, when signal is provided by modulation source 20 the frequency variations of the frequency modulated oscillator 13 no longer correspond with the frequency variations of the oscillator 2, but a continuous difference in frequency exists between the oscillations which is representative of intelligence "B." The frequency deviations of the oscillator 13 may be represented by the graph 22, if the relative wave shapes of intelligence "A" and intelligence "B,"

represented generally in graphs 23 and 24, i. e., correspond with sine waves, "B" having three times the frequency of "A."

While in practice simple sine waves will not in general be transmitted, such sine waves, when considered as sources of modulating signal, enable certain simplifications in exposition. In the present case it will be seen that the frequency deviations provided at the output of harmonic generators 3 are sine wave deviations, corresponding in frequency with the frequency illustrated in the plot 23. On the other hand, the deviations of frequency provided at the output of harmonic generators 14 represent the superposition of sine waves representative of intelligences "A" and "B," the latter being a third harmonic of the former.

It will be clear that a conventional frequency modulation receiver, upon receiving the frequency modulated energy radiated from antenna 8, will derive intelligence "A," since such receivers have the inherent capability of detecting or demodulating the stronger of two co-channel signals in the presence of the weaker, without interference from the latter, provided the latter is sufficiently weaker than the stronger signal. On the other hand, a conventional frequency modulation receiver will be incapable of deriving intelligence "B," firstly because intelligence "B" is masked by the high power output from power amplifier 6, and, secondly, because the frequency modulated oscillator 13 is not modulated solely in response to intelligence "B," but contains composite intelligence, representative of both "A" and "B."

If intelligence "A" represents random signals, or unintelligible masking signals, conventional receivers will be incapable of deriving any intelligence from the radiations provided by the antenna 8, despite the fact that intelligence "B" actually exists in the transmitted signals.

Reference is now made to Figure 2 of the accompanying drawings wherein is illustrated schematically a circuit diagram representative of a frequency modulation receiver, which is capable of deriving both intelligence "A" and intelligence "B," each without interference from the other. In the event that intelligence "A" represents a masking signal, the intelligence "B" may, nevertheless, be derived.

Referring now more specifically to Figure 2 of the accompanying drawings the reference numeral 30 identifies an antenna for receiving signals transmitted by the antenna 8 of Figure 1. Signals intercepted by receiving antenna 30 are applied to a conventional radio frequency amplifier and converter 31 for conversion to an intermediate frequency signal, which is amplified in a conventional intermediate frequency amplifier 32. The output of the intermediate frequency amplifier 32 may then be applied to a limiter 33 and discriminator 34, which provides, at its output, intelligence "A," to an amplifier 35, without intereference from signals provided by modulation source "B," by reason of the fact that the latter is received on a carrier of relatively low amplitude as compared with the amplitude of the carrier which contains solely intelligence "A."

The output of the I. F. amplifier 32 is likewise applied to a beat frequency detector and discriminator 36 which provides at its output a signal corresponding in amplitude at each instant to the difference in frequency between the two carriers A and $A+B$, and accordingly which represents the beat frequency $q$, as defined in my prior application Serial #133,871, filed December 19, 1949, and entitled "FM Systems I." The output of the beat frequency detector and discriminator 36, or a signal corresponding in amplitude to the frequency $q$ at each instant, is applied to a phase inverter 37, at the output of which is generated two replicas of the output of beat frequency detector and discriminator 36, which are, however, of opposite phases at each instant. It may be realized from the theoretical discussion which has been provided in my prior applications, above identified, that the phase of the output of beat frequency detector and discriminator 36 must be corrected, and that when corrected, this signal will represent modulation B. Correction is accomplished by applying the two outputs of the phase inverter 37 to a polarity correction gating circuit 38, which in response to gating waves provided by a gating wave generator 39, allows the signal of one phase or the other of the two phase signals derived from the phase inverter 37 to pass to an audio amplifier 40. The gating waves provided by the gating wave generator 39 are generated in a gating wave generator control circuit 41 in response to signals derived from I. F. amplifier 32. It will be realized that the beat frequency detector and discriminator 36, the phase inverter 37, the polarity correction gating circuit 38, the gating wave generator 39, and the gating wave generator control circuit 41, are identical with those illustrated and correspondingly identified in my application Serial #133,871, filed December 19, 1949, Figure 4, and that detailed circuit diagrams of various specific arrangements of the components represented by blocks in Figure 4 of that application are provided in Figures 2, 3 and 6 of that application and particularly in Figure 2 of that application, which represents a preferred embodiment of the invention. Accordingly, a more detailed disclosure of the specific circuits utilized in making up the block components of the system of Figure 2 of the present application is dispensed with in the present application, reference being made for such disclosure to my prior application Serial No. 133,871, now Patent No. 2,684,439 issued July 20, 1954.

Figure 3:
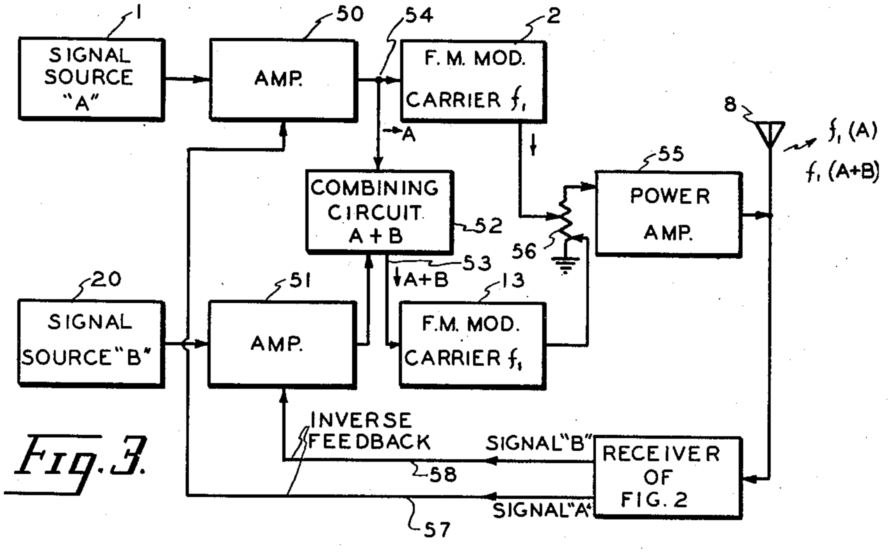
Figure 3 is a block diagram of a modification of the system of Figure 1 wherein inverse feed back means are utilized at the transmitter for reducing distortion which may otherwise be expected at the receiver.

Referring now more particularly to the system of Figure 3 of the accompanying drawings, there is illustrated a modification of the transmitter of Figure 1, wherein is introduced certain predistortions, to compensate for distortions which may be expected to occur in the receiving system of Figure 2 of the accompanying drawings. Accordingly, the same numerals of reference are utilized in Figures 1 and 3 to identify corresponding parts of the circuit, the system of Figure 3 being, however, simplified in certain respects.

There is, accordingly, provided a signal source A identified by reference numeral 1, and a signal source B identified by reference numeral 20. Signal source A feeds the signal A into an amplifier 50 while signal source B feeds the signal B into an amplifier 51. The outputs of the amplifiers 50 and 51 are applied to a combining circuit 52, which in the embodiment of the invention illustrated in Figure 1 of the drawings is represented by the transformer 11, and which supplies at its output on lead 53 a voltage corresponding instantaneously to the sum of the voltages A and B. On the other hand, the signal A alone is applied to the lead 54. As in the system of Figure 1 that component of the sum signal $A+B$ which appears on lead 53 which is due to signal A alone, is in phase and of the same amplitude as the signal appearing on the lead 54, and which likewise is due to signal A alone. Signal A is applied to an FM modulator 2 while signal $A+B$ is applied to an FM modulator 13, as in Figure 1, it being understood that each of the modulators operates in conjunction with a carrier frequency having an unmodulated value $f_1$. The outputs of the modulators 2 and 13 are applied to a power amplifier 55 and radiated by means of antenna 8, the relative powers of the carriers as they derive from modulators 2 and 13, respectively, being such that the carrier derived from modulator 2 is in considerable degree the stronger of the two carriers. At the output of the power amplifier 55 there appears carrier $f_1$ modulated by signal A in frequency, at high amplitude, and carrier signal $f_1$ modulated in frequency by signals $A+B$, but at lower amplitude. The necessary control of the relative amplitudes of the signals deriving from modulators 2 and 13 may be provided by means of a suitable potentiometer 56. The system as so far described corresponds in all its essentials with the system of Figure 1.

In accordance with the improvement envisaged in Figure 3 of the drawings, the output of the power amplifier 55 is received by a receiving system corresponding with that illustrated in Figure 2 of the accompanying drawings, so that there is supplied at the output leads of the receiver the two signals A and B, the A signal appearing on lead 57 and the B signal on lead 58. The B signal appearing on lead 58 is applied to the amplifier 51 in inverse phase to the signal deriving from the signal source 20, while the A signal appearing on lead 57 is applied to the amplifier 50 in inverse phase to the A signal deriving from signal source A. To the extent that the A signal as derived on lead 57 duplicates precisely that provided by the source 1 the net result is a reduction in amplitude of the output of the amplifier 50, and this reduction in amplitude is all that would occur were the receiver of Figure 2 perfect in respect to introduction of distortion. If, however, the receiver of Figure 2 introduces distortion the feed-back signal to the amplifier 51 contains not only the B signal but also this distortion, which then appears as a component part of the $A+B$ signal when the latter is applied to the combining circuit 52. The B signal accordingly is predistorted by the feed-back signal. A similar set of events occurs in respect to the A signal.

The output modulated carriers, provided by the power amplifier 55, accordingly contain not only modulations due to signals A and B, but also modulations due to predistortion corresponding with distortion which may be expected to be introduced by the receiver of Figure 2. This predistortion, however, is of opposite phase to that which may be expected to be introduced by the receiver of Figure 2. Accordingly, when signals radiated by the antenna 8 are received at a remote location by a receiver corresponding with that illustrated in Figure 2 of the accompanying drawings, receiver detects the signals A and B, and also detects the predistortion inherent on the carriers. Additionally, the receiver produces its own distortion. The latter, however, is of opposite phase to that corresponding with the predistortion introduced into the receiver from the transmitter. Accordingly, the distortion introduced by the receiver of Figure 2 at the remote location is substantially compensated for or removed.

Referring now to Figure 4 of the accompanying drawings, there is illustrated in functional block diagram a system corresponding generally to the system of Figure 1 of the accompanying drawings except in two fundamental respects, i. e., that where in the system of Figure 1 the signal A alone is transmitted, in the system of Figure 4 the modulation signal is $A+B$ while in that channel which in Figure 1 transmits modulation signal $A+B$, in Figure 4 transmits modulation signal $A-B$. Additionally, both transmitted carriers are of the same amplitude. Identical numerals of reference are utilized to identify corresponding components in the systems of Figures 1, 3 and 4.

In the system illustrated in Figure 4, a signal combiner 52 is provided which derives a sum signal corresponding with the sum of modulations A and B, the modulation sources 1 and 2 being connected to the input of this signal combiner 52. There is provided an additional signal combiner 52′ to the input of which are supplied signals A and B, but which supplies at its output a composite signal representative at each instant of the difference of A and B, or $A-B$. The output of the signal combiner 52 is applied to frequency modulate a carrier in frequency modulator 2 while the output of signal combiner 52′ is similarly applied to a frequency modulator 13. The frequency modulators 2 and 13 transmit on the same unmodulated carrier $f_1$. Both carriers are applied to the input of power amplifier 55 at the same amplitude levels. The combined carriers are then radiated by means of antenna 8.

The signals transmitted radiated by antenna 8 are received by antenna 30 and applied to an R. F. converter and I. F. amplifier 31, 32, two reference numerals being applied so that the receiver of Figure 5 may correspond with the receiver of Figure 2. The output of the I. F. amplifier 32 is applied then to a limiter 33 and the output of the latter to a discriminator 34 which applies the discriminated output to an audio amplifier 35. At the output of the latter will be found the signal A. That this will be so will be immediately evident when it is considered that the input to the discriminator 35 consists of equal carriers modulated by signals $A+B$ and $A-B$. If the discriminator 34 is properly tuned, at its output will be found the sum of the signals applied to its input. Since the carrier modulated in response to the signal A+B is of the same amplitude as is the carrier modulated in response to the signal $A-B$, and the deviations of the carrier produced by the signals A and by the signals B, respectively, are equal in all cases, the total deviation produced in response to the signal B is zero and the total deviation produced in response to the signal A corresponds with that signal alone, or, otherwise stated, in the discriminator of the receiver two frequency deviations in opposite direction and of equal amount occur in response to the signal B, so that the total response of the discriminator to deviations corresponding in frequency to the amplitude of the signal B total zero.

A further channel is provided for detecting the signal B. It will be evident that the amplitude of signal B corresponds to the frequency difference between the two carriers transmitted by the modulators 2 and 13, respectively, or to the beat frequency between the transmitted carriers. In this beat frequency the deviations caused by the signal A total zero at all times, while the deviations caused by the signal B are produced in one sense in the modulator 2 and in the other sense in the modulator 13, so that the total frequency difference between the two carriers which is due solely to the modulating signal B is proportional to twice B. The circuit which is utilized for deriving the detected value of the deviation 2B, or for detecting the beat frequency between the two transmitted carriers, duplicates that found in Figure 2 of the drawings. Accordingly, no further description of the operation of the system of Figure 5 is required, reference being made to the description of the system of Figure 2 for that purpose.

Reference is now made more specifically to Figures 6 and 7 of the accompanying drawings. Figure 6 illustrates a transmitter, which is of the general character of that illustrated in Figure 1 of the drawings, in that a source of modulation A is utilized to modulate the frequency of a carrier $f_1$ supplied by an oscillator 2 and in that a signal B supplied by a source 20 is combined with the signal A in a combining circuit 52 and applied to modulate the frequency of an oscillator 13′. The oscillator 13, however, in contra-distinction to the mode of operation contemplated in the system of Figure 1, generates a frequency $f_2$ when unmodulated, which is different from $f_1$. Carriers $f_1$ and $f_2$ may be modulated in the same sense and to the same extent in response to signal A, and may be radiated from an antenna 8 after amplification in a power amplifier 55 at different intensities, carrier $f_1$ being the stronger. The two carriers $f_1$ and $f_2$ may be received by means of an antenna 30 and applied to an R. F. stage, converter, and I. F. amplifier, the output of the I. F. amplifier 32 may be applied to limiter 33, the output of the latter to a discriminator 34, and the output of the latter to an audio amplifier 35, from the output of which is available signal A. The channel comprising elements 31 to 35, inclusive, corresponds then with a conventional frequency modulation receiver, and is capable of detecting the signal A from the carrier $f_1$, by reason of the fact that the latter is of greater amplitude than is the frequency $f_2$. Additionally, the frequencies $f_1$ and $f_2$ may be so spaced that they never overlap in response to modulation by signals A and $A+B$, respectively. The signal provided by the antenna 30 is further applied to an R. F. stage, frequency converter, and I. F. amplifier, 60, which is capable of receiving, converting and amplifying at intermediate frequency the carriers $f_1$ and $f_2$ simultaneously. The output of the unit 60 is applied to a beat frequency detector and discriminator 36, as in the system of Figure 2, and the output of the latter will then be signal B. It will be noted that the system of Figure 7 is inherently very much simpler than is the system of Figure 2, in that no correction is necessary for the phase of the beat signal between the carriers $f_1$ and $f_2$, which, in the system of Figure 2 corresponds with the frequency $\pm q$. This simplification is accomplished by the spacing of the carriers $f_1$ and $f_2$ so that they do not overlap in response to modulating signals. The expedient of separating carrier signals, accordingly, is one which results in a vast simplification of the necessary receiving equipment for the two carriers. At the same time the spacing between carriers $f_1$ and $f_2$ when unmodulated would not be equal to one channel width, as in conventional systems, but may be equal to only one half of one channel width, as a minimum, i. e. the system requires 1.5 channels rather than the conventional two channels for the transmission of two modulations, if both signals A and B produce frequency deviations of similar extent. In general, the spacing between the carriers in the absence of modulation must be equal to or greater than the maximum deviation in one direction which may be produced by the signal B. This permits utilization of deviation in response to signal A of the standard value of $\pm 75$ kc., while maximum deviation of carrier $f_2$ in response to signal B alone may be made small, i. e. $\pm 25$ kc., for example. In such case the carriers $f_1$ and $f_2$ may be spaced, when unmodulated, by 25 kc., or slightly more.

Referring now more specifically to the system of Figures 8 and 9, it will be noted that the transmitter of Figure 8 combines the principles involved in the system of Figures 4 and 6, while the receiver of Figure 9 is similar to that utilized in Figure 7 of the accompanying drawings. More specifically the transmitter of Figure 8 employs a source of signal A, identified by reference numeral 1, and a source of signal B identified by the reference numeral 20. The signals A and B are additively combined in combining circuit 52 and differentially combined in combining circuit 52'. The modulation signal corresponding with the sum of signals A and B is then applied to frequency modulate a carrier $f_1$ in an FM modulator 2 while the modulation signal provided by combining circuit 52', and which corresponds with the difference between signals A and B is utilized to frequency modulate a carrier $f_2$. The system of Figure 8 accordingly corresponds with the system of Figure 4 in respect to utilization of both additive and differential combinations of modulation signals. At the same time the carriers $f_1$ and $f_2$ are separated in respect to mean frequency, as in the system of Figure 6. The amplitude of the carrier $f_1$ as transmitted is arranged to be equal to the amplitude of the carrier $f_2$. Additionally, the carrier $f_1$ and the carrier $f_2$ are both deviated in frequency by precisely the same amount in response to signals A and in response to signals B.

The two carriers, $f_1$ and $f_2$, are received by an R. F. stage, converted to intermediate frequency by a suitable converter, and amplified in an I. F. amplifier, the assemblage for accomplishing this purpose being identified by reference numerals 31 and 32. The I. F. amplifier is arranged to have sufficient band width to accommodate both carriers $f_1$ and $f_2$, simultaneously, for all frequency values thereof during the modulation process. The output of the I. F. amplifier 32 is then applied to an amplitude limiter 33 and the output of the latter is applied to a discriminator 34' which may have a mean frequency, or a zero response, at the frequency $$\frac{f_1+f_2}{2}$$

or at some other convenient value. Accordingly, the carriers $f_1$ and $f_2$ when unmodulated, and impressed, after frequency conversion and limiting, on the discriminator 34', produce zero output, since the higher of the frequencies produces a positive response and the lower of the frequencies a negative response, and these responses are equal. Modulaton of the two carriers $f_1$ and $f_2$ in response to the signal A, is, however, always in the same sense. Accordingly, these modulations produce correspondingly polarized outputs from the discriminator 34', so that the output of the discriminator 34' contains an audio signal component corresponding with the modulation A. On the other hand, deviations of the carriers $f_1$ and $f_2$ in response to the signal B are in opposite directions, so that one of these deviations produces a positive response at each instant and the other a negative response at each instant, at the output of the discriminator 34', the positive and negative responses being at all times equal. Accordingly, any modulation of the carriers $f_1$ and $f_2$ due to the signal B are cancelled, and the output of the channel corresponds solely with signal A.

The output of the I. F. amplifier of circuit element 31, 32 is applied to a beat frequency detector and discriminator 60 which corresponds with that utilized in the system of Figure 7. The beat frequency detector and discriminator 60 essentially measures the difference between the carriers $f_1$ and $f_2$ at each instant, and supplies an audio signal corresponding in amplitude with this difference in frequency. Since the modulation signal A at the transmitter of Figure 8 produces correspondingly sensed deviations of the carriers $f_1$ and $f_2$ at each instant, and since these deviations are maintained always of the same magnitude, no difference in the beat frequency occurs by reason of the modulation of the carriers $f_1$ and $f_2$ in response to signal A. Accordingly, the output of the beat frequency detector and discriminator 60 contains no component due to signal A. In respect to signal B, on the other hand, the carrier $f_1$ is modulated in one direction and the carrier $f_2$ in the opposite direction by the signal. Accordingly, the total difference in frequency between the carriers $f_1$ and $f_2$ which may be attributed solely to the modulation signal B is proportional to the signal B.

More accurately stated the frequency $f_1$ deviates in response to the signal B in one direction by an amount $B_1$, while the carrier $f_2$ deviates in the opposite direction by an amount $B_1$, so that the total difference between the frequencies $f_1$ and $f_2$ which is due to the modulation signal B is $2B_1$. It is this deviation which is detected by the beat frequency detector and discriminator 60 and appears at the output thereof, and accordingly that output corresponds with signal B. It is true that at the output may appear also a steady D.-C. voltage corresponding with the unmodulated difference between carriers $f_1$ and $f_2$, but this may be readily removed by means of a condenser.

The advantage with the system of Figures 8 and 9 has over conventional systems of transmitting two modulations is that the total channel width which is required in the system of Figures 8 and 9 is less than is required in conventional systems. This is true in the first place because no guard band is required to separate the $f_1$ and $f_2$ channels. In the second place the carriers $f_1$ and $f_2$ may be separated by a frequency interval less than the total deviation of either carrier, since occasional overlap of modulated carriers during the modulation process is not important. Additionally, smaller frequency deviations may be employed than is conventional because each channel of the receivers of the system contains signal derived additively from two carriers, and hence provides a strong response in response to a small deviation, and specifically double the response which might be expected from a single carrier, conventionally modulated.

In general, in the system of Figures 1 and 2 wherever addition of modulation signals A and B is specified algebraic addition is intended, with B initially of either algebraic sign. Similarly, in the system of Figure 6, modulation B may be subtracted in the combining circuit 52. Essentially, whether addition or subtraction is utilized is immaterial, since the choice of one or the other operation is equivalent to a choice of one phase or the opposite phase for modulation B.

Specifically, in the system of Figure 3, while the feedback path is illustrated as including a complete receiver, it is not essential that this be the case since but little distortion need be anticipated in the receiver due to R. F. stages, convertor and I. F. stages. Accordingly, the receiver illustrated in Figure 3 may, in actuality be considerably simplified, and need not be a duplicate of the receiver of Figure 2 except as to those stages following the I. F. stage, or in respect to limiter and discriminator, and in respect to those components which serve to derive the "B" signal, and may omit entirely A. F. amplifiers, I. F. amplifier, R. F. amplifier, and the like.

Further, the systems of Figures 1 and 2, 3, and of Figures 4 and 5, while described as involving two carriers of substantially identical frequency, operate equally when the carriers are not substantially equal, or when the carriers are substantially displaced. Such displacement effectively results in a D.-C. component in the "B" signal, which may readily be removed in the receiver by capacity or transformer coupling which exists in the receiver.

While I have described and illustrated several specific embodiments of the present invention it will be clear that variations thereof, in detail and in general arrangement, may be resorted to without departing from the true scope of the invention.

What I claim and desire to secure by Letters Patent of the United States is:

1. In a communications system, a source of first modulation voltage, a source of second modulation voltage, means responsive to said first modulation voltage for generating a frequency modulated carrier having frequency deviations continuously substantially proportional to said first modulation voltage, means responsive to said first and second voltages for generating a further frequency modulated carrier having frequency deviations continuously substantially proportional to the algebraic sum of said first modulation voltage and said second modulation voltage, and means for transmitting said carriers.

2. In a frequency modulation receiver, a source of first carrier modulated in frequency in accordance with a first modulation voltage, a source of second carrier modulated in frequency in accordance with the algebraic sum of said first modulation voltage and a second modulation voltage, means for deriving a beat frequency signal representative instantaneously of the difference in the frequencies of said first and second carriers, and means responsive to said beat frequency signal for generating said second modulation voltage, said first and second carriers having substantially the same mean frequencies.

3. In a frequency modulation receiver for demodulating a first carrier modulated in frequency in accordance with a first modulation voltage and a second carrier overlapping said first carrier in frequency and modulated in frequency in accordance with the algebraic sum of said first modulation voltage and a second modulation voltage, means to derive said second modulation voltage, comprising, means for continuously measuring the difference in frequency between said first and second carriers, and means responsive to said means for measuring said frequency difference for generating said second modulation voltage.

4. The combination in accordance with claim 3 wherein said last means comprises means for sensing whether said second carrier is instantaneously higher or lower in frequency than said first carrier and for generating a control signal in response to said sensing, and means responsive to said control signal for determining the instantaneous polarity of said second modulation voltage.

5. In a communications system, a source of modulation signal A, a source of modulation signal B, a source of first carrier, a source of second carrier, means for modulating said first carrier in frequency at least in response to said signal A, means for modulating said second carrier in frequency in response to both A and B, both means for modulating so constructed and arranged that the total deviations of both said first and second carriers in response to said signal A are equal, means for receiving said carriers at a remote location, said means for receiving comprising means for deriving from said carriers alone said signal A and said signal B, each substantially without interference from the other.

6. The combination in accordance with claim 5 wherein said first carrier is modulated only in response to said signal A.

7. The combination in accordance with claim 5 wherein said first carrier is modulated in response to both signal A and signal B.

8. The combination in accordance with claim 5 wherein said first carrier is modulated in response to signal A alone and wherein said second carrier is modulated in response to said signal A and said signal B simultaneously, and wherein the deviations of said first and second carriers in response to said signal A are in the same sense and substantially equal in magnitude.

9. The combination in accordance with claim 5 wherein said first and second carriers have equal mean values of frequency.

10. The combination in accordance with claim 5 wherein said first and second carriers are separated in mean frequency by a frequency interval greater than the greatest frequency deviation of said second carrier producible by said signal B.

11. The combination in accordance with claim 5 wherein said first and second carriers are of different mean frequencies.

12. The combination in accordance with claim 5 wherein said first carrier is modulated in response to both signal A and signal B and wherein said first and second carriers have equal mean frequencies.

13. The combination in accordance with claim 5 wherein said first carrier is modulated in response to both signals A and B and wherein said first and second carriers have a predetermined mean separation greater than the total frequency deviation of either of said carriers.

14. The combination in accordance with claim 5 wherein one of said carriers is modulated in frequency in response to the algebraic sum of the amplitudes of said signals A and B and the other of said carriers is modulated in response to the algebraic difference of the amplitudes of said signals A and B.

15. The combination in accordance with claim 1 wherein said frequency modulated carriers overlap in frequency during said modulations.

16. The combination in accordance with claim 1 wherein said frequency modulated carriers have substantially equal mean frequencies.

17. The combination in accordance with claim 1 wherein said frequency modulated carriers are co-channel and wherein said first carrier is materially lower in amplitude than said second carrier.

18. The combination in accordance with claim 1 wherein is further provided receiving means for receiving said carriers and for detecting from the received carriers in response to said carriers said first and second modulations each without interference from the other.

19. The combination in accordance with claim 1 wherein said frequency modulated carriers overlap in frequency during said modulations, and wherein is further provided receiving means for receiving said carriers, and for detecting said second modulation voltage in response to said carriers, without interference from the first modulation voltage.

20. The combination in accordance with claim 1 wherein said frequency modulated carriers have substantially equal mean frequencies, and wherein is further provided receiving means for receiving said carriers and for detecting said second modulation voltage in response to said carriers and without interference from said first modulation voltage.

21. The combination in accordance with claim 1 wherein said frequency modulated carriers are co-channel and wherein said further frequency modulated carrier is materially lower in amplitude than said frequency modulated carrier, and wherein is further provided means for receiving said carriers and for detecting from the received carriers said second modulation voltage.

References Cited in the file of this patent

UNITED STATES PATENTS

| | | |
|---|---|---|
| 2,418,119 | Hansen | Apr. 1, 1947 |
| 2,463,503 | Atkins | Mar. 8, 1949 |
| 2,463,505 | Atkins | Mar. 8, 1949 |

FOREIGN PATENTS

| | | |
|---|---|---|
| 562,915 | Great Britain | July 21, 1944 |